Aug. 12, 1930.   E. J. BEACH   1,773,073
OIL SEPARATOR
Filed Nov. 28, 1927
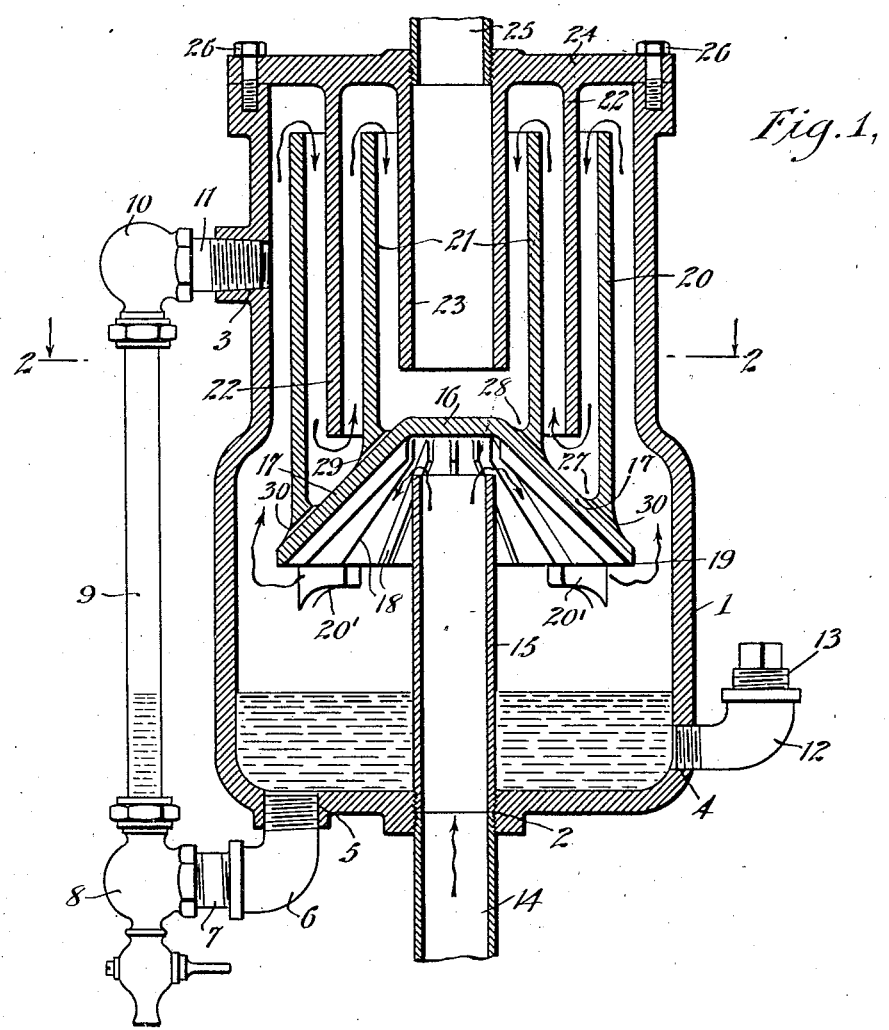
Fig. 1,
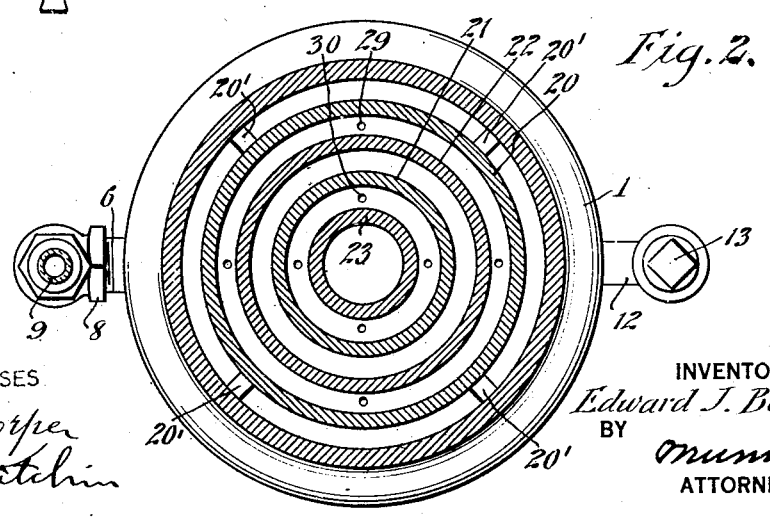
Fig. 2.
WITNESSES
Edw. Thorpe
A. L. Nitchin
INVENTOR
Edward J. Beach
BY
Munn & Co.
ATTORNEY Patented Aug. 12, 1930

1,773,073

UNITED STATES PATENT OFFICE

EDWARD J. BEACH, OF BROOKLYN, NEW YORK

OIL SEPARATOR

Application filed November 28, 1927. Serial No. 236,246.

This invention relates to devices for separating oil from air, and has for an object to provide an improved construction adapted particularly to be used in connection with rotary air compressors, the structure being such that the compressor may be rotated at any desired speed without interfering with the proper and efficient operation of the separator.

Another object of the invention is to provide an oil separator for air compressors or other devices, wherein the desired volume of compressed air may be secured while the separator functions to remove the oil.

A further object, more specifically, is to provide an oil separator for removing oil from compressed air, wherein the air and oil are caused to change direction sharply a plurality of times before the air escapes, thus causing the oil to impinge on draining surfaces at each change of direction.

In the accompanying drawing—

Figure 1 is a longitudinal vertical sectional view through an oil separator disclosing an embodiment of the invention.

Figure 2 is a transverse sectional view through Figure 1 approximately on line 2—2.

Referring to the accompanying drawing by numerals, 1 indicates an outside housing which is open at the top, and at the bottom is provided with a threaded aperture 2, while a threaded aperture 3 is formed in the side near the top. A second aperture 4 is formed in the side of the casing 1 near the bottom, while a second aperture 5 is formed in the bottom of the casing and adapted to receive an elbow 6 which is connected through pipe 7 to a valve 8. This valve carries a glass gage 9 connected through a suitable fitting 10 to the threaded member 11 which is screwed into the aperture 3. Oil in the casing 1 may be drawn off from time to time through valve 8, and by reason of the glass gage 9, the level of the oil may be noticed at all times. Instead of having the valve 8, a turn pipe could be provided and the oil directly drained back into the air compressor or other device. An outlet member 12 is screwed into the threaded aperture 4, said outlet member being normally closed by a plug 13. The end of the air discharge pipe 14 leading from the air compressor is screwed into the aperture 2, while a similar pipe 15 is screwed into the aperture 2 from the inside, said pipe 15 discharging the compressed air and oil against the flattened end 16 of the deflecting cone 17. This cone is provided with a number of ribs 18 which assist in catching the oil as the oil and air are deflected. Preferably the lower portion of the cone 17 is provided with a comparatively sharp edge 19 which acts as a drip edge for directing the oil caught within the cone downwardly into the bottom of the casing 1. This cone may be supported in any desired manner, as for instance, by suitable brackets 20' carried by casing 1. Preferably cast integral with the cone 17, are annular webs 20 and 21 which extend to almost the top of the casing 1, said webs being spaced apart sufficiently to receive the annular web 22 and leave a desired space therebetween so that air passing from edge 19 will have a very tortuous passageway until it reaches the discharge tube 23 formed preferably integral with the covering plate 24. An outlet pipe 25 is threaded into the tube 23 and may extend to any desired point. Plate 24 is secured to the casing 1 by any suitable means, as for instance, screws 26. As the air passes upwardly from edge 19 it must pass over the upper edge of the web 20 and then downwardly under the lower edge of web 22 and again upwardly over the upper edge of web 21, and from thence downwardly and back up a short distance into the tube 23. In this way, four changes of direction of the air and oil are secured after the oil and air leave the edge 19.

In using rotary air compressors, a comparatively large amount of lubricating oil is necessary to prevent wear and to cause the blades to have a substantially air-tight fit. As the pump functions, some of this oil is more or less vaporous and, consequently, is carried off with the air. Most of the oil carried off with the air is condensed or caught by the cone 17 and is allowed to drip off the edge 19 into the bottom of casing 1. The air which is comparatively clean of oil, passes from edge 19 as above described, and at each change of direction, an appreciable deposit of the oil is secured until the air is free of oil by the time it enters the tube 23. The side walls of the various webs 20 to 22 inclusive, become eventually moist with oil, and this oil runs down the surface of these webs and drops into the spaces 27 and 28. Web 21 is provided with one or more drain apertures 29, whereby the oil from the space 28 drains into a space 27. Web 20 is provided with one or more drainage apertures 30 so that the oil will drain down over edge 19. These drainage apertures are very small and, consequently, the weight of the oil in the spaces 27 and 28 will prevent any air from passing upwardly, while the oil may freely pass downwardly.

What I claim is:

1. In an oil and air separator, a casing, an inverted cone arranged in said casing, a plurality of annular spaced upstanding flanges mounted on top of said cone, a covering plate for said casing formed with a pair of annular depending flanges, one flange acting as a discharge tube, said second mentioned flanges telescoping into the first mentioned flanges in spaced relation, and means for directing air and oil to a point near the center of said cone and above the bottom edge of the cone.

2. In an oil and air separator, an inverted cone member provided with a plurality of webs on its under face radiating from a central point, and a plurality of spaced cylindrical flanges on its upper face, each of said flanges having a drainage aperture at its base.

3. In an oil and air separator, a casing, an inverted cone-shaped abutment arranged in the casing, means for directing air and oil against said abutment centrally thereof, a plurality of annular concentrically positioned flanges upstanding from said abutment, each flange having a drainage passageway at its base, and means acting as an annular flange extending from the top of the casing into the bore of each of said annular flanges and spaced therefrom, said means being provided with an air discharge outlet, said air and oil directing means having its discharge end within said abutment and near said central point so that the oil and air must almost reverse its direction of travel.

4. An air and oil separator, comprising a casing closed at the bottom and open at the top, a pipe extending through the bottom of the casing for directing a mixture of oil and air to substantially the center of the casing, an inverted cone carried by the casing interiorly thereof but spaced therefrom, said cone being arranged above said pipe for receiving the discharge from the pipe in order to reverse the direction of movement of the air, and oil and at the same time catch some of the oil, said pipe projecting to a point near the center of the cone and above the edges of the cone, said cone directing the air and oil downwardly and radially outwardly for attenuating the air so that a large proportion of the oil may be released, a plurality of spaced annular upstanding flanges mounted on the upper surface of said cone, a cover plate for the open end of said casing, said cover plate being formed with a plurality of spaced depending flanges extending downwardly toward said cone and telescoping past the first-mentioned flanges but spaced therefrom and falling short of said cone, whereby air passing from the cone will pass from the cone to a point between the casing and said annular upstanding flanges and thence alternately past the depending and upstanding flanges, whereby the air and oil must change directions a number of times, and means for directing the cleaned air to a discharge point.

Signed at Brooklyn in the county of Kings and State of New York this 19th day of Nov. A. D. 1927.

EDWARD J. BEACH.